United States Patent
Lyons et al.

(10) Patent No.: US 7,589,779 B2
(45) Date of Patent: Sep. 15, 2009

(54) IMAGING MODULE, INTERFACE, AND METHOD HANDLING MULTIPLE SIMULTANEOUS DATA TYPES

(75) Inventors: George Lyons, Langley (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 1000 days.

(21) Appl. No.: 11/104,899

(22) Filed: Apr. 13, 2005

(65) Prior Publication Data
US 2006/0232808 A1    Oct. 19, 2006

(51) Int. Cl.
*H04N 5/222*   (2006.01)
(52) U.S. Cl. .............................. 348/333.01; 348/333.11
(58) Field of Classification Search .............. 348/211.2, 348/333.01, 333.11; 455/556.2
See application file for complete search history.

(56) References Cited

U.S. PATENT DOCUMENTS

| | | | |
|---|---|---|---|
| 5,164,831 A | 11/1992 | Kuchta et al. | |
| 5,990,949 A | 11/1999 | Haruki | |
| 6,542,192 B2 | 4/2003 | Akiyama et al. | |
| 6,847,388 B2 * | 1/2005 | Anderson | 715/854 |
| 2001/0002142 A1 | 5/2001 | Akiyama et al. | |
| 2002/0041761 A1 * | 4/2002 | Glotzbach et al. | 396/429 |
| 2002/0140830 A1 | 10/2002 | Shirakawa et al. | |
| 2003/0090573 A1 | 5/2003 | Tojo | |
| 2003/0117513 A1 | 6/2003 | Anderson | |
| 2003/0122952 A1 | 7/2003 | Kuroiwa | |
| 2003/0160874 A1 | 8/2003 | Kuroiwa | |
| 2003/0218682 A1 | 11/2003 | Lim et al. | |
| 2004/0046873 A1 | 3/2004 | Kubo et al. | |
| 2004/0119840 A1 | 6/2004 | Ishihara et al. | |
| 2004/0201721 A1 * | 10/2004 | Baharav et al. | 348/222.1 |
| 2004/0263663 A1 * | 12/2004 | Lee et al. | 348/333.11 |
| 2006/0098111 A1 * | 5/2006 | Goh et al. | 348/333.05 |

* cited by examiner

*Primary Examiner*—Kelly L Jerabek

(57) ABSTRACT

A method is provided for transmitting image data in a plurality of formats simultaneously over a data path. Successive data blocks, each comprising compressed image data representing a block of pixels of a first image are transmitted over a data path. During intervals between transmission of the successive data blocks, image data representing at least a portion of a second image is transmitted along the data path. An imaging module and imaging device capable of transmitting high resolution compressed data and lo resolution uncompressed data simultaneously over a data path are also provided.

6 Claims, 3 Drawing Sheets

IMAGING MODULE, INTERFACE, AND METHOD HANDLING MULTIPLE SIMULTANEOUS DATA TYPES

BACKGROUND OF THE INVENTION

1. Field of the Invention

The present invention relates to image display systems and more particularly to display controllers that interface between a source of image data and a display device.

2. Description of the Related Art

Modern hand-held digital imaging devices include dedicated digital cameras and cell phones, personal digital assistants (PDAs), and other devices incorporating digital imaging functionality. The imaging system in these devices include an image sensor and various electronics to pass the image from the sensor to a display or to memory. Certain imaging modules containing the sensor are capable of operating in one of two modes depending upon whether the image is being sent to the display or the memory.

In a first mode, referred to herein as a preview mode, the imaging module provides a low-resolution image in an uncompressed format which is refreshed several or many times each second. This provides preview image data that may be sent directly to the display for real time previewing of the image being captured by the sensor.

In a second mode, referred to herein as a capture mode, the imaging module provides a higher resolution image in a compressed format. This compressed image data may then be stored by the imaging device in non-volatile memory or transmitted to some remote storage location.

A problem arises that, during the image capture mode, the display ceases receiving preview image data while the higher resolution image is compressed and sent to the memory. Depending upon the resolution of the image, processor and bus speed, and other attributes, this interruption of preview image data can last several seconds. As a result of the interruption of preview image data transmission, the display may freeze or be blanked-out until the preview image data resumes.

This can lead the user to become frustrated while waiting for the resumption of the preview image which can therefore lead to a poor perception of the product. Prior attempts at reducing the interruption of the preview image updates have revolved around increasing the processing power and clock frequency of the system. However, these methods have resulted in poor battery life and extra cost.

Thus, there exists an unmet need to reduce or eliminate the interruption of the preview image data while in the capture mode without negatively impacting the cost, complexity, or battery life of the product.

SUMMARY OF THE INVENTION

Broadly speaking, the present invention fills these needs by providing an imaging module, interface, and method that handles multiple simultaneous data types.

It should be appreciated that the present invention can be implemented in numerous ways, including as a process, an apparatus, a system, a device, or a method. Several inventive embodiments of the present invention are described below.

In one embodiment, a method is provided for transmitting image data in a plurality of formats simultaneously over a data path by transmitting successive data blocks, each comprising compressed image data representing a block of pixels of a first image, and transmitting image data representing at least a portion of a second image along the data path during intervals between transmissions of the successive data blocks.

In another embodiment, an imaging module is provided that comprises an image sensor, a block-based image compression encoder and a data multiplexer. The encoder receives uncompressed image data representing a first image captured by the image sensor and provides in series a plurality of data blocks each comprising compressed image data representing a block of pixels of the image. The data multiplexer transmits along the data path, successive ones of the data blocks and image data representing at least a portion of an uncompressed second image along the data path during intervals between data block transmissions of the successive data blocks.

In yet another embodiment, an imaging device is provided that comprises an imaging module, a data path, and a graphics controller. The imaging device is operable in at least a preview mode and an image capture mode. In the preview mode, the imaging module transmits successive preview images in an uncompressed format along the data path to the graphics controller. In the image capture mode, the imaging module performs a block-based image compression on a capture image, and transmits along the data path successive data blocks, each data block containing compressed data representing a block of pixels from the first image. The imaging module transmits at least a portion of one of the preview images along the data path during intervals of time between the successive blocks.

Other aspects and advantages will become apparent from the following detailed description, taken in conjunction with the accompanying drawings, illustrating by way of example the principles of the invention.

BRIEF DESCRIPTION OF THE DRAWINGS

The embodiments will be readily understood by the following detailed description in conjunction with the accompanying drawings, and like reference numerals designate like structural elements.

DETAILED DESCRIPTION

Figure 1:
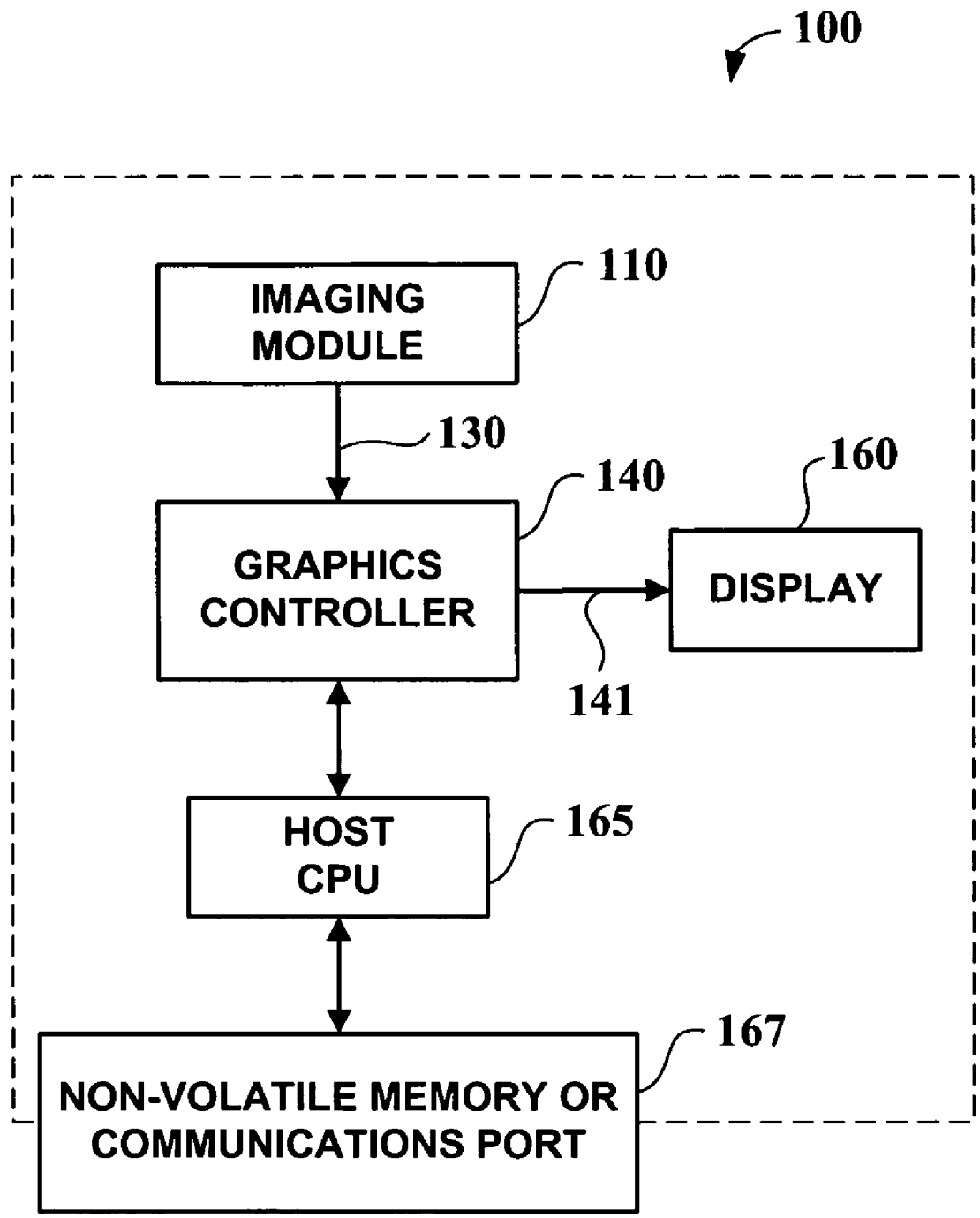
FIG. 1 shows a schematic overview of an electronic imaging device in accordance with one embodiment of the invention.

FIG. 1 is a schematic overview of an imaging device 100. Imaging device 100 may be a digital camera, digital video recorder, or some electronic device incorporating a digital camera or video recorder functionality, such as, for example, a personal digital assistant (PDA), cell phone or other communications device. Imaging device 100 includes an imaging module 110, a graphics controller 140, a host central processing unit (CPU) 165, and a display 160.

The timing control signals and data lines, such as line 141 communicating between graphics controller 140 and display 160, are shown as a single line but may in fact be several address, data, and control lines and/or a bus. All communication lines shown in the figures will be presented in this manner except as noted to reduce the complexity and better present the novel aspects of the invention.

Host CPU 165 performs digital processing operations and communicates with graphics controller 140. Host CPU is also in communication with non-volatile memory (NVM) or communication port 167. NVM or communications port 167 may be internal NVM such as flash memory or other EEPROM, or magnetic media. Alternatively, NVM or communications port 167 may take the form of a removable memory card such as that widely available and sold under such trademarks as "SD RAM," "Compact Flash," and "Memory Stick." NVM or communications port 167 may also be any other type of machine-readable removable or non-removable media. Finally, NVM or communications port 167 may be a communications port to some external storage device or destination. For example, if imaging device 100 is a communications device such as a cell phone, NVM or communications port 167 may represent a wireless communications link to a carrier, which may then store data on hard drives as a service to customers, or transmit the data to another cell phone or email address.

Display 160 can be any form of display capable of displaying an image. Generally, display 160 will comprise a liquid crystal display (LCD). However, other types of displays are available or may become available that are capable of displaying an image. Although imaging module 110 and display 160 are presented as being part of imaging device 100, it is possible that one or both of imaging module 110 and display 160 are external to or even remote from each other and/or graphics controller 140. For example, if imaging device 100 is a security camera or baby monitor, for instance, it may be desirable to provide a display 160 remote from the imaging module 110 to provide monitoring capability at a remote location.

Imaging module 110 may have varying resolutions depending upon the application. In one embodiment, imaging module 110 includes a color sensor containing a two-dimensional array of pixel sensors in which each pixel sensor has a color filter in front of it in what is known as a color filter array (CFA). One common type of CFA is the Bayer filter in which every other pixel has a green filter over it in a checkerboard pattern, with remaining pixels in alternate rows having blue and red filters. When the color sensor reads out data from an image capture, the raw data is referred to as "CFA data" which describes a single two-dimensional array of pixels containing information for all three primary colors of red, green, and blue. This contrasts with RGB data which describes three two-dimensional arrays, or "planes" of pixels: one plane for red intensity, one plane for blue intensity, and one plane for green intensity.

Imaging device 100 is capable of operating in a preview mode and in a capture mode. In the preview mode, low resolution preview images are periodically captured and transmitted to graphics controller 140 in a manner to be described in more detail below. In one embodiment the low resolution images are encoded as YUV image data containing three planes of data including one for luminance, and two for chrominance. It is also possible for imaging device 100 to transmit preview image data in other formats. Exemplary formats include raw data formats such as CFA data and RGB formats providing a separate plane of data for each of red, green and blue values. Depending on the data format provided, graphics controller 140 may be required to reconfigure the image data as necessary to drive display 160.

In the capture mode, imaging device 100 receives, compresses, and stores (and/or transmits) a high-resolution image. In one embodiment, imaging module 110 includes image processing circuitry to compress the image using a block-based image compression format such as the well known JPEG image format. Other examples of known block-based image compression formats include JPEG2000, and MPEG. In block-based image compression algorithms, a block of pixels, e.g., an eight pixel by eight pixel block of pixel data, is compressed to take up less space in memory. The compression algorithm does not reduce the size of the image, just the amount of information necessary to reconstruct the image. So, for example, an eight-by-eight block of pixels requiring 24 bits per pixel requires 192 8-bit bytes of RAM. Using JPEG image compression, the same image block can be stored in about one seventh the space, i.e., 24-25 bytes, without significant loss of image quality. This allows seven times the number of pictures to be stored in a given memory space and allows the image to be transmitted to a remote location seven times faster than would be possible without compression.

When imaging module 110 processes the image using the block-based algorithm, each block is processed independently of the other blocks. When one block is finished being processed, the encoder proceeds to the next block. Thus, data is ready for transmission while other data is being posted. Imaging module 110 can then send the data that is ready while still processing the next piece of data. However, the data compression takes longer than the data transmission so there is some dead time between data transmissions. In one embodiment, imaging module 110 sends low resolution image data in YUV format during the dead times between data transmissions of data representing a compressed image block. In this manner, high resolution compressed images and low resolution uncompressed images are simultaneously transmitted to graphics controller 140. By "simultaneously" it is meant that the low-resolution image is transmitted during the transmission of the compressed image. However, the compressed image and the uncompressed image are not both transmitted at the same instant in time. Rather, the low resolution image is transmitted during breaks in the transmission of the compressed image. These breaks, hereinafter referred to as, "dead time" occur naturally during the compressing and transmission of the high resolution compressed image. This process is described in further detail below with reference to FIG. 3.

Figure 2:
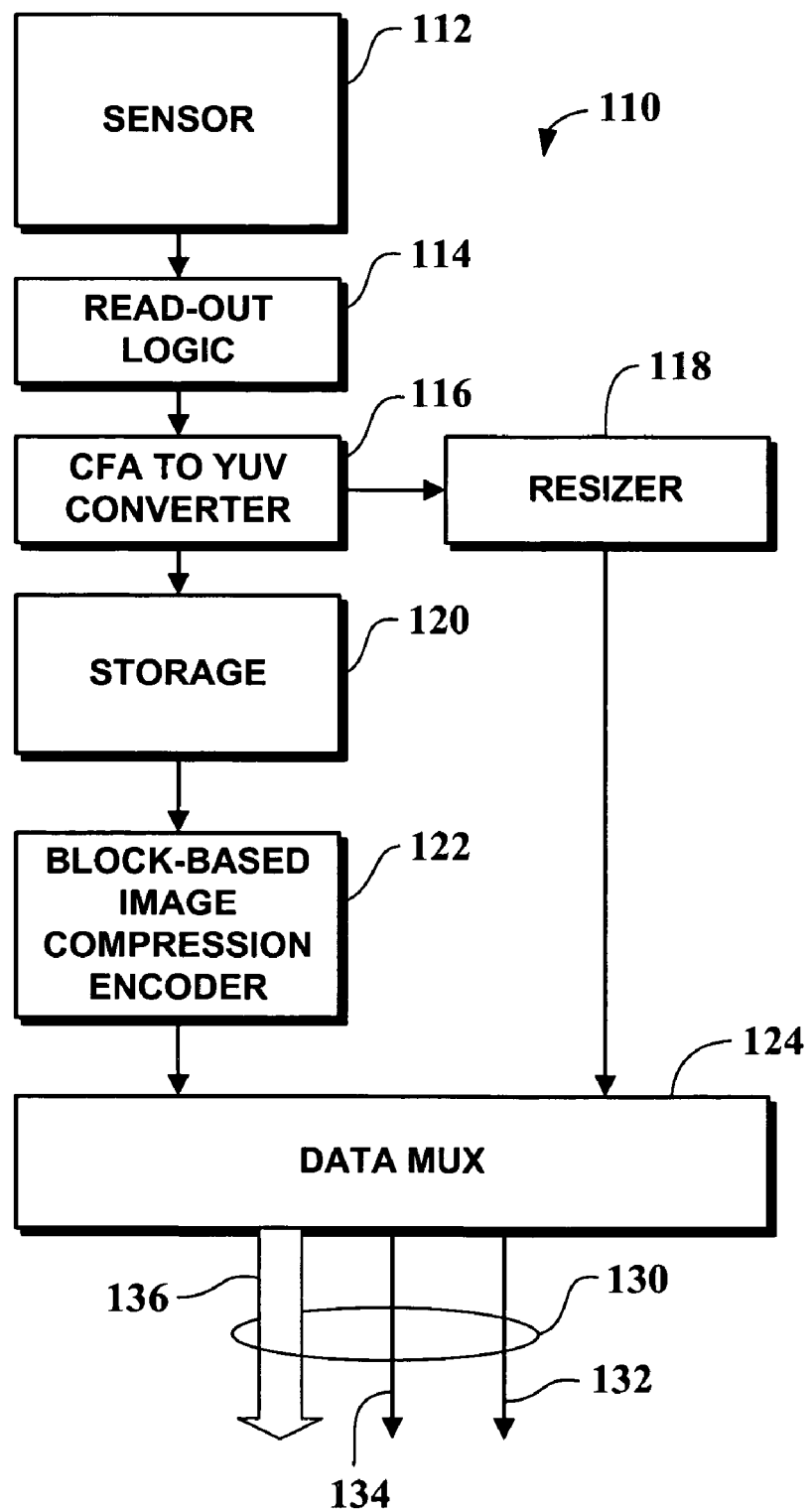
FIG. 2 shows a block diagram depicting an embodiment of an imaging module in accordance with one embodiment of the invention.

FIG. 2 shows a block diagram depicting an exemplary embodiment of imaging module 110. Sensor 112 may be a charged coupled device (CCD) or a complimentary metal oxide semiconductor (CMOS) type image sensor. The sensor may be used with a lens that focuses an image onto the surface of the sensor which then converts the light energy into electronic signals representing the intensity of the light. For color devices, sensor 112 generates raw data in a CFA format. Read-out logic 114 reads the data from sensor 112 and passes the data to CFA to YUV converter 116. CFA to YUV converter receives the raw CFA data and outputs data in YUV format. YUV data is passed to both a resizer 118 and a storage buffer 120. Resizer 118 converts a full YUV image into a smaller YUV image by either averaging the values of groups of pixels, or else selecting every nth pixel and inserting it into a new smaller image. In one embodiment, the resized image is used for displaying a preview image as will be described below with reference to FIG. 3.

Block-based image compression encoder 122 reads data from storage buffer 120 and outputs compressed data in bursts corresponding to each processed image block. Data multiplexer (mux) 124 receives data from block-based image compression encoder 122 and resizer 118, and outputs data along data line 130. Data mux 124 selects from the two sources depending on a select signal (not shown) that is based on the mode of operation and timing signals (not shown) in a manner that would be understood by those in the art.

Data line 130 includes three sets of signal paths, including a vertical reference (VREF) signal path CMVREF 132, a horizontal reference (HREF) signal path CMHREF 134, and a data signal path CMDATA 136. In one embodiment, CMVREF 132 and CMHREF 134 represent a single bit while CMDATA 136 may be any number of bits wide, e.g., 16 bits wide.

Figure 3:
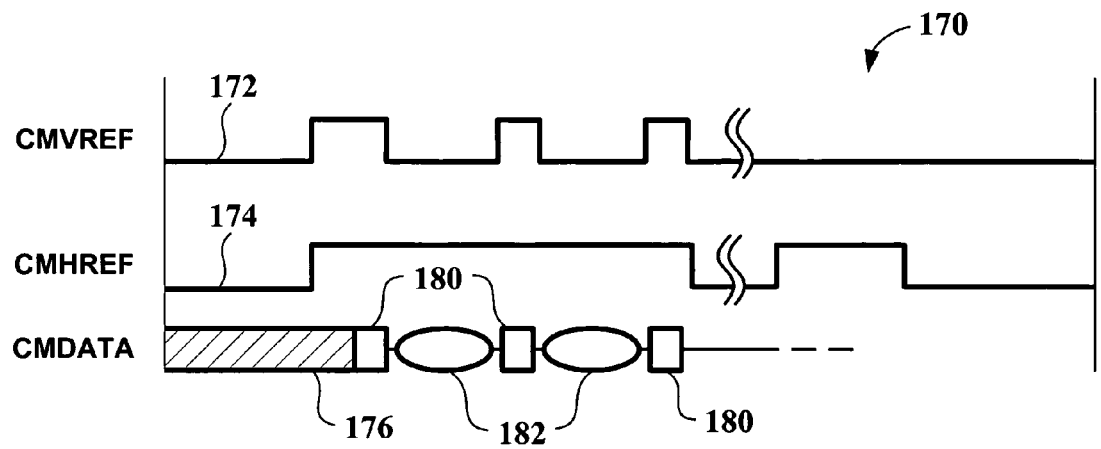
FIG. 3 shows a timing diagram presenting a scheme for distinguishing between preview image data and image capture data in accordance with one embodiment of the invention.

FIG. 3 shows a timing diagram 170 presenting a scheme for distinguishing between preview image data and image capture data in accordance with one embodiment of the invention. A VREF signal CMVREF 172 and an HREF signal CMHREF 174 work together to provide data transmission status information. While either CMVREF 172 or CMHREF 174 remains HIGH, then a frame of capture data (when in the capture mode) is being transmitted. During this time, if CMVREF is inverted, i.e. in this case, goes LOW, then a data block 180 representing a block of high-resolution image data is finished transmitting and the data lines 136 (FIG. 2) are available for transmitting preview image data 182. CMVREF and CMHREF go low after the captured image is completed its transmission to graphics controller 140 (FIG. 1). It will be noted that the CMVREF and CMHREF signals may of course be inverted without affecting the operation of the device. Thus, without increasing the number of control signals, the status of the data lines and the type of data transmitted can be communicated to graphics controller 140.

Other methods of controlling the data flow are contemplated. For example, an additional control signal (not shown) can be provided which would indicate dead times between transmissions of data blocks 180 or various other necessary status information depending upon the application. Using these control signals, data representing an entire preview image may be transmitted between blocks, or portions of a preview image may be transmitted between blocks. The preview image need not be resized or converted from the raw data format for simultaneous transmission. In this case, the graphics controller 140 (FIG. 1) may perform any needed processing. Thus, the preview image data may be of any size or format. Furthermore, the preview image and the compressed image may be the same image, i.e., images originating from the same raw data from sensor 112 (FIG. 2), or different images.

Figure 4:
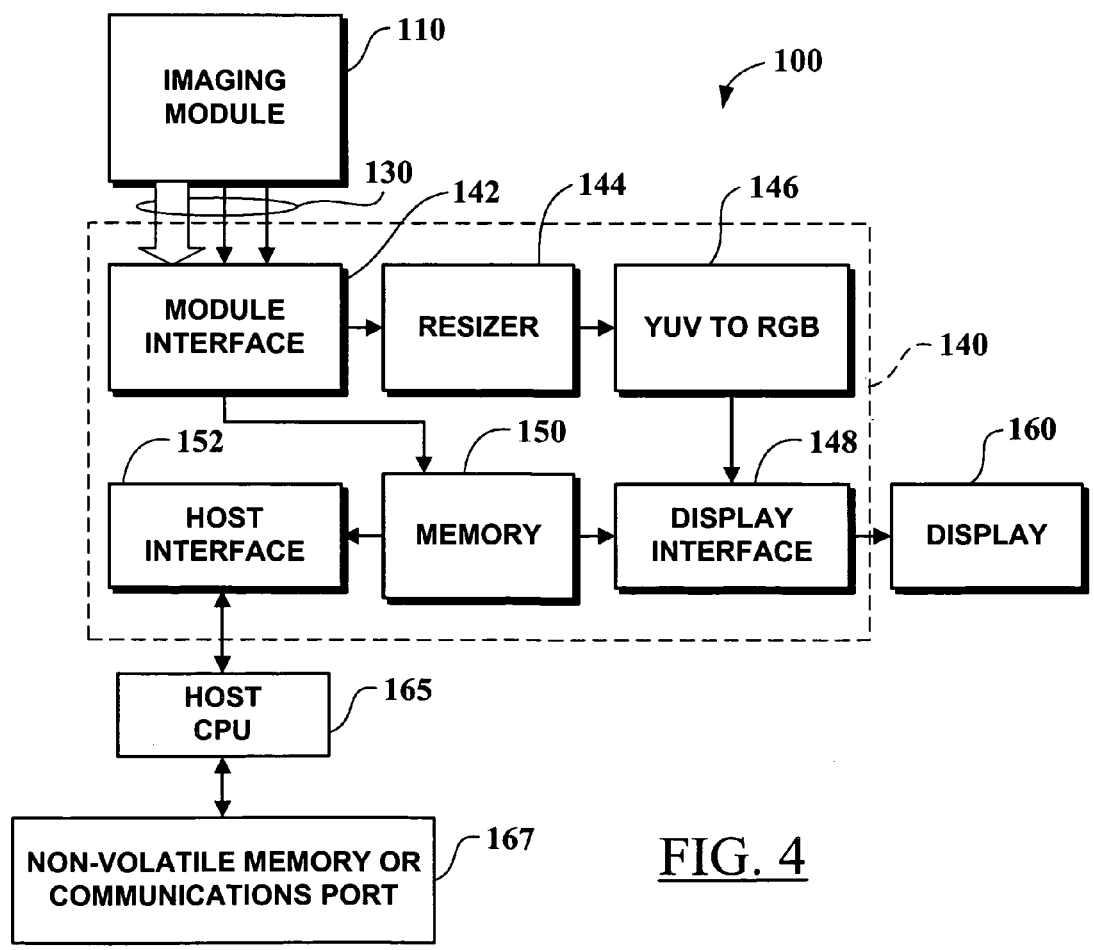
FIG. 4 shows a block diagram of an imaging device 100 showing functional blocks making up a graphics controller in accordance with one embodiment of the invention.

FIG. 4 shows a block diagram of an exemplary imaging device 100 showing functional blocks making up graphics controller 140. Module interface 142 receives data and control signals from imaging module 110. Depending on the status of the control signals, image data received from imaging module 110 is passed to resizer 144 or memory 150.

If imaging device 100 is in preview mode, then preview image data only is received from imaging module 110 and this data is passed to the resizer 144. Resizer 144 may resize the image depending on circumstances. For example, when receiving a preview image, it may be desirable to further reduce the preview image so that it does not take up the entire display 160, e.g., so that a message can be displayed along with the preview image. Alternatively, resizer 144 may be turned off so that data passes through to YUV to RGB converter 146.

YUV to RGB converter 146 converts the preview image into RGB format so that it is in a format acceptable for display 160. Display interface 148 receives RGB data representing the preview image and passes it to display 160 so that a user can see the preview image.

When in capture mode, module interface 142 receives both preview image data and image capture data simultaneously. In this case, as described above with reference to FIG. 3, the control signals can determine whether the data received is preview image data, in which case it is sent to resizer 144, or image capture data, in which case it is sent to memory 150. When the data is image preview data, the image is processed or simply passed along by resizer 144, YUV to RGB converter 146 and display interface 148 as in the preview mode described above. The image capture data is passed to memory 150, which may be a memory buffer or other type of temporary storage. Memory 150 may include a memory controller and on-chip RAM or other high speed memory. Host 165 accesses memory 150 via host interface 152 to retrieve the image data, which is then stored or transmitted by non-volatile memory or communications port 167 as described above with reference to FIG. 1.

Graphics controller 140 may include additional features and functional elements which were not herein described so as to not obscure the novel aspects of the invention. Furthermore, certain elements may be unnecessary. For example, if imaging module 110 includes a converter to place the image into RGB format, YUV to RGB converter 146 may not be required. Also, resizer 144 may not be required depending on the capabilities of resizer 118 in image module 110 (FIG. 2). Although no long-term storage of the preview images is described, it is of course possible to store the preview images as a video. This would allow a videographer, while recording a video, to press a button, and with little or no pause in the video, capture a high resolution image of the event being videoed. Depending on the implementation, the frame rate may be slightly reduced while downloading the high resolution image. Various other modifications and/or enhancements may be made without departing from the spirit and scope of the invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. An imaging device comprising:
   an imaging module;
   a data path; and
   a graphics controller, the imaging device being operable in at least a preview mode and an image capture mode, wherein in the preview mode, the imaging module transmits successive preview images in an uncompressed format along the data path to the graphics controller, and in the image capture mode, the imaging module performs a block-based image compression on a capture image, and transmits along the data path successive data blocks, each data block containing compressed data representing a block of pixels from the capture image, the imaging module transmitting along the data path at least a portion of one of the preview images during intervals of time between the successive blocks.

2. The imaging device of claim 1 wherein the graphics controller stores the capture image in memory.

3. The imaging device of claim 1 further comprising a display, the graphics controller passing preview images to the display in real time.

4. The imaging device of claim 1 wherein each preview image is a low resolution image and, in the image capture mode, the preview image is transmitted in its entirety during one of the intervals.

5. The imaging device of claim 1 wherein the image device is a hand held battery operated device.

6. The imaging device of claim 5 wherein the image device is one of a cell phone or personal digital assistant.

\* \* \* \* \*

UNITED STATES PATENT AND TRADEMARK OFFICE
CERTIFICATE OF CORRECTION

PATENT NO. : 7,589,779 B2  Page 1 of 1
APPLICATION NO. : 11/104899
DATED : September 15, 2009
INVENTOR(S) : Lyons et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this

Fourteenth Day of December, 2010

David J. Kappos
*Director of the United States Patent and Trademark Office*